(12) United States Patent
Jeong et al.

(10) Patent No.: US 8,139,561 B2
(45) Date of Patent: Mar. 20, 2012

(54) METHOD FOR WIRELESS INTERNET COMMUNICATION IN MOBILE COMMUNICATION TERMINAL

(75) Inventors: Chang-Ki Jeong, Gumi-si (KR); Jeon-Man Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1911 days.

(21) Appl. No.: 11/258,038

(22) Filed: Oct. 26, 2005

(65) Prior Publication Data

US 2006/0092924 A1    May 4, 2006

(30) Foreign Application Priority Data

Nov. 1, 2004    (KR) .................. 10-2004-0087796

(51) Int. Cl.
H04L 12/66 (2006.01)
H04B 7/216 (2006.01)
H04B 1/04 (2006.01)
H04M 1/00 (2006.01)
H01Q 11/12 (2006.01)

(52) U.S. Cl. ..... 370/352; 370/320; 370/908; 455/127.4; 455/552.1; 455/553.1

(58) Field of Classification Search ............... 455/569.1, 455/569.2, 458, 566, 550.1–553.1, 41.2, 455/127.4; 370/352, 320, 329, 338, 401, 370/908, 328

See application file for complete search history.

(56) References Cited

U.S. PATENT DOCUMENTS

| | | | |
|---|---|---|---|
| 6,621,802 B1 * | 9/2003 | Johansson | 370/329 |
| 2003/0027591 A1 * | 2/2003 | Wall | 455/556 |
| 2003/0179724 A1 * | 9/2003 | Seo | 370/320 |
| 2003/0203746 A1 * | 10/2003 | Iwase | 455/569.1 |
| 2003/0220835 A1 * | 11/2003 | Barnes, Jr. | 705/14 |
| 2004/0176128 A1 * | 9/2004 | Grabelsky et al. | 455/553.1 |
| 2005/0113103 A1 * | 5/2005 | Snowden et al. | 455/451 |
| 2005/0136949 A1 * | 6/2005 | Barnes, Jr. | 455/461 |
| 2006/0073841 A1 * | 4/2006 | Narasimha et al. | 455/458 |

FOREIGN PATENT DOCUMENTS

| | | |
|---|---|---|
| CN | 1454026 A | 11/2003 |
| WO | WO 03/054721 A1 | 7/2003 |

* cited by examiner

*Primary Examiner* — Thjuan K Addy
(74) *Attorney, Agent, or Firm* — Roylance, Abrams, Berdo & Goodman, LLP

(57) ABSTRACT

A method for a wireless Internet communication in a mobile communication terminal is provided. In an operation of starting a wireless Internet function, it is determined if a data call is being serviced and, if a data call is not serviced, the wireless Internet function is started by setting the wireless Internet function as a data call. In an operation of originating or terminating a voice call, it is determined if a wireless Internet function is being performed and, if the wireless Internet function is being performed, the wireless Internet function and a voice call service are substantially simultaneously started. Accordingly, in the wireless Internet communication method of the mobile communication terminal, a W-LAN function is set in the same manner as that in which a CDMA data call is set through modification of the SVD scheme, so that a W-LAN data protocol such as the DHCP (which can be used when the W-LAN function is set) and a voice call service can be provided at the same time. Herein, when software that does not support data concurrency is employed, it is possible to prevent the origination of a CDMA data call capable of causing an erroneous operation during the W-LAN operation.

16 Claims, 8 Drawing Sheets

METHOD FOR WIRELESS INTERNET COMMUNICATION IN MOBILE COMMUNICATION TERMINAL

PRIORITY

This application claims the benefit under 35 U.S.C. §119(a) of Korean Patent Application entitled "Method for Wireless Internet Communication in Mobile Communication Terminal" filed in the Korean Intellectual Property Office on Nov. 1, 2004 and assigned Serial No. 2004-87796, the entire contents of which are hereby incorporated by reference.

BACKGROUND OF THE INVENTION

1. Field of the Invention

The present invention relates to a mobile communication terminal. More particularly, the present invention relates to a method for accessing a wireless-local area network (W-LAN) and performing wireless internet communications in a mobile communication terminal.

2. Description of the Related Art

Generally, the term "mobile communication terminal" refers to a device for performing voice communication by communicating with a base station linked with a Public Switched Telephone Network (PSTN) through a specific wireless frequency band allocated to a communication provider. This mobile communication terminal increasingly expands the coverage thereof as a terminal capable of processing multimedia data by performing a satellite broadcast or terrestrial broadcast listening function, a Moving Picture Experts Group (MPEG), audio layer 3 (MP3) music file reproducing function and so on in addition to its original function such as a voice communication function.

Particularly, as Internet becomes popular, research and development in mobile communication technologies for enabling the mobile communication terminal to receive Internet services are actively being pursued. These Internet services are usually provided by connecting a mobile communication terminal based on a code division multiple access (CDMA) scheme to the Internet linked with a base station. Accordingly, connection to the Internet through a base station in a CDMA scheme costs as much as voice communication.

The construction of a network through a wireless LAN (W-LAN) has been popularly used in order to support information sharing between information terminals such as personal computers (PCs), personal digital assistants (PDAs), and notebook computers. Such a W-LAN, which is used in restricted space such as a department store, an office and a school, is constructed to be connected to the Internet through a router having a wire/wireless link with an access point (AP) prepared for transmitting/receiving radio data to/from the information terminal. Although this W-LAN can have access to the Internet only in such restricted spaces, the W-LAN enables economical Internet services due to allowing access to wired Internet through the router. Therefore, recently, a mobile communication terminal for receiving Internet services through a connection to such a W-LAN is being developed and implemented.

The mobile communication terminal for receiving Internet services through such a W-LAN comprises an additional W-LAN module for making communication by wirelessly connecting to the W-LAN. In other words, this mobile communication terminal comprises a CDMA system using a CDMA frequency band such as a frequency band of 800 MHz in a case of cellular CDMA, and a W-LAN system using a W-LAN frequency band, such as a frequency band of 2.4 GHz in the case of the IEEE 801.11b standard realized in one terminal. Hereinafter, the mobile communication terminal capable of receiving such a W-LAN service will be referred to as a "dual-band dual-mode (DBDM)" terminal. Currently, many communication providers are developing a CDMA service and a W-LAN service using a CDMA mobile station modem (MSM) chip in order to implement the DMDM terminal by simple modification without changing an existing design and existing parts. Herein, the W-LAN module may be mounted externally such as on the outside of the CDMA MSM chip, and a CDMA and W-LAN software is installed internally such as in the CDMA MSM chip.

However, when functions for receiving the CDMA service and the W-LAN service using such the CDMA MSM chip are implemented, CDMA voice calls/data calls and W-LAN data are not processed at the same time. In other words, the W-LAN service is not received while receiving the CDMA service, and, in reverse, the CDMA service is not received while receiving the W-LAN service.

Accordingly, a need exists for a method for accessing a wireless-local area network (W-LAN) and performing wireless internet communications in a mobile communication terminal without the inconvenience caused when the W-LAN service is not received while receiving the CDMA service.

SUMMARY OF THE INVENTION

Accordingly, the present invention has been made to solve the above-mentioned problems occurring in the prior art, and an object of the present invention is to provide a method for wireless LAN (W-LAN) communication in a mobile communication terminal capable of simultaneously performing a code division multiple access (CDMA) service and a W-LAN service.

To accomplish the above objects, a method for wireless Internet communication in a mobile communication terminal is provided. The method comprises the steps of in an operation of starting a wireless Internet function determining if a data call is being serviced, and if a data call is not being serviced, starting the wireless Internet function by setting the wireless Internet function as a data call.

Preferably, the method further comprises the steps of, in an operation of originating or terminating a voice call, determining if a wireless Internet function is being performed, and if the wireless Internet function is being performed, simultaneously starting the wireless Internet function and a voice call service.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention will be described in greater detail with reference to the accompanying drawings. In the following description of the present invention, a detailed description of known functions and configurations incorporated herein will be omitted for clarity and conciseness.

Figure 1:
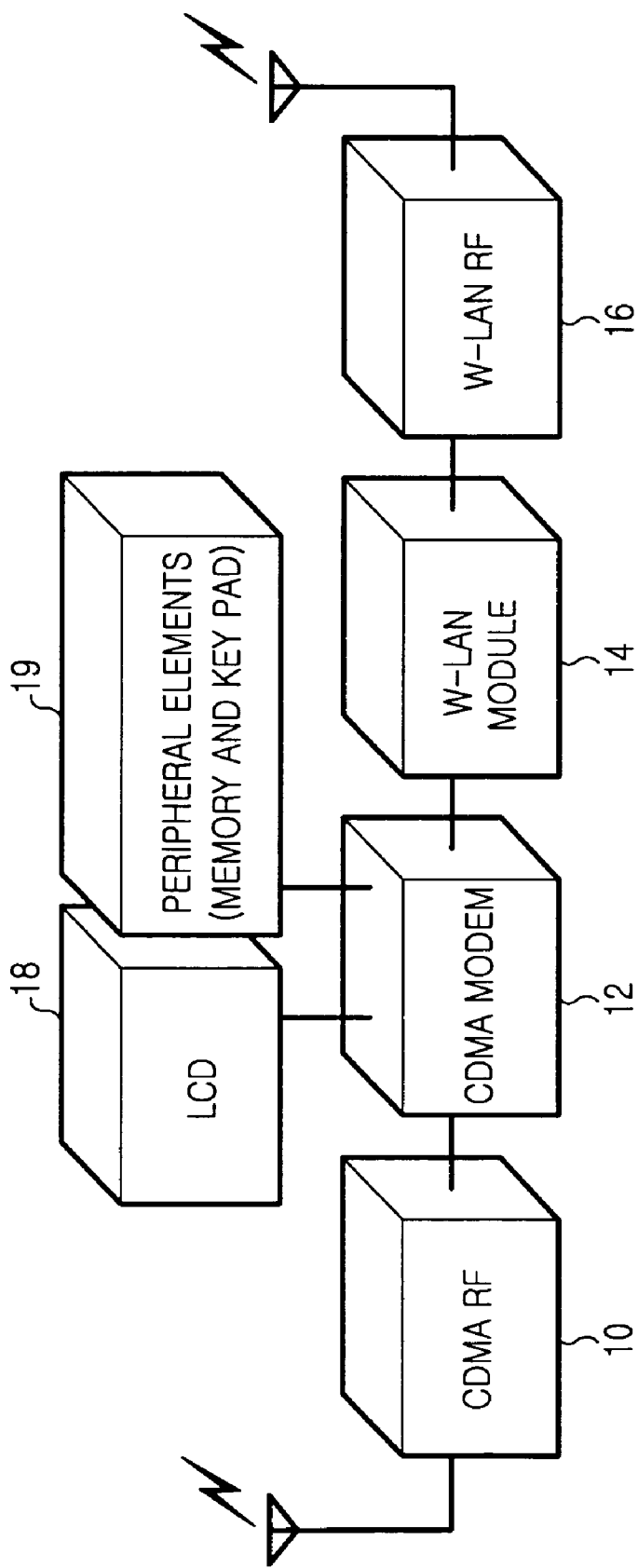
FIG. 1 is a schematic block diagram illustrating a mobile communication terminal according to an exemplary embodiment of the present invention.

FIG. 1 is a schematic block diagram illustrating a structure of a mobile communication terminal according to an exemplary embodiment the present invention. A dual-band dual-mode (DBDM) terminal according to an exemplary embodiment of the present invention comprises a Code Division Multiple Access (CDMA) radio frequency (RF) unit 10 used for CDMA radio communication, a CDMA modem 12 used for processing CDMA transmit/receive data, a wireless-local area network (W-LAN) RF unit 16 used for W-LAN communication, a W-LAN module 14 for processing W-LAN data, a display unit 18 comprising a Liquid Crystal Display (LCD) device, and peripheral elements 19 comprising a memory and a key pad.

The CDMA RF unit 10 up-converts and amplifies output data of the CDMA modem 12 in order to wirelessly transmit the output data to a base station (not shown). In addition, the CDMA RF unit 10 down-converts and amplifies data wirelessly received from the base station so as to provide the data to the CDMA modem 12. Similarly, the W-LAN RF unit 16 performs a radio processing operation with respect to output data of the W-LAN module 14 in order to wirelessly transmit the output data to an access point (AP). In addition, the W-LAN RF unit 16 receives a signal transmitted from the AP in a W-LAN so as to transmit the signal to the W-LAN module 14. The W-LAN module 14 processes Internet data in connection with the W-LAN under the control of the CDMA modem 12.

The CDMA modem 12 generally controls the overall operation of the DBDM terminal and comprises a microprocessor and a modulation/demodulation codec embedded therein and a function of controlling the display unit 18 and the peripheral elements 19 in addition to original functions of a mobile communication terminal such as a function of Pulse Code Modulation (PCM)-modulating/demodulating a voice signal to be output. Specifically, the CDMA modem 12 preferably simultaneously or substantially simultaneously performs a CDMA function and a W-LAN function in connection with the W-LAN module 14 according to an exemplary embodiment of the present invention. According to an exemplary embodiment of the present invention, a W-LAN function or a W-LAN service connection is established in the same manner, as that in which a CDMA data call is established, so that a CDMA voice call and a W-LAN function can be serviced at the same time. In other words, the setting for the W-LAN is achieved from a time point to establish the W-LAN function and not from a time point to establish the W-LAN service connection in the same manner, as that in which the CDMA data call is established, so that a W-LAN data protocol such as a dynamic host configuration protocol (DHCP), which can be used while setting the W-LAN function, and a voice call can be serviced at the same time. In the following description, this scheme will be described as an example. In addition, a scheme, in which the W-LAN service is processed from a time point to establish the W-LAN service connection in the same manner, as that in which the CDMA data call is established, may be employed. However, this scheme is identical to a scheme, in which the W-LAN service is processed from a time point to establish the W-LAN function in the same manner, as that in which the CDMA data call is established, except for only a difference between setting time points. Hereinafter, an operation of substantially simultaneously performing this CDMA service and this W-LAN function will be described in greater detail with reference to the accompanying drawings. It is to be understood that the establishment of the W-LAN function and the CDMA service can occur with a time delay. In either case, at least part of the W-LAN service and CDMA service are concurrent.

Figure 2:
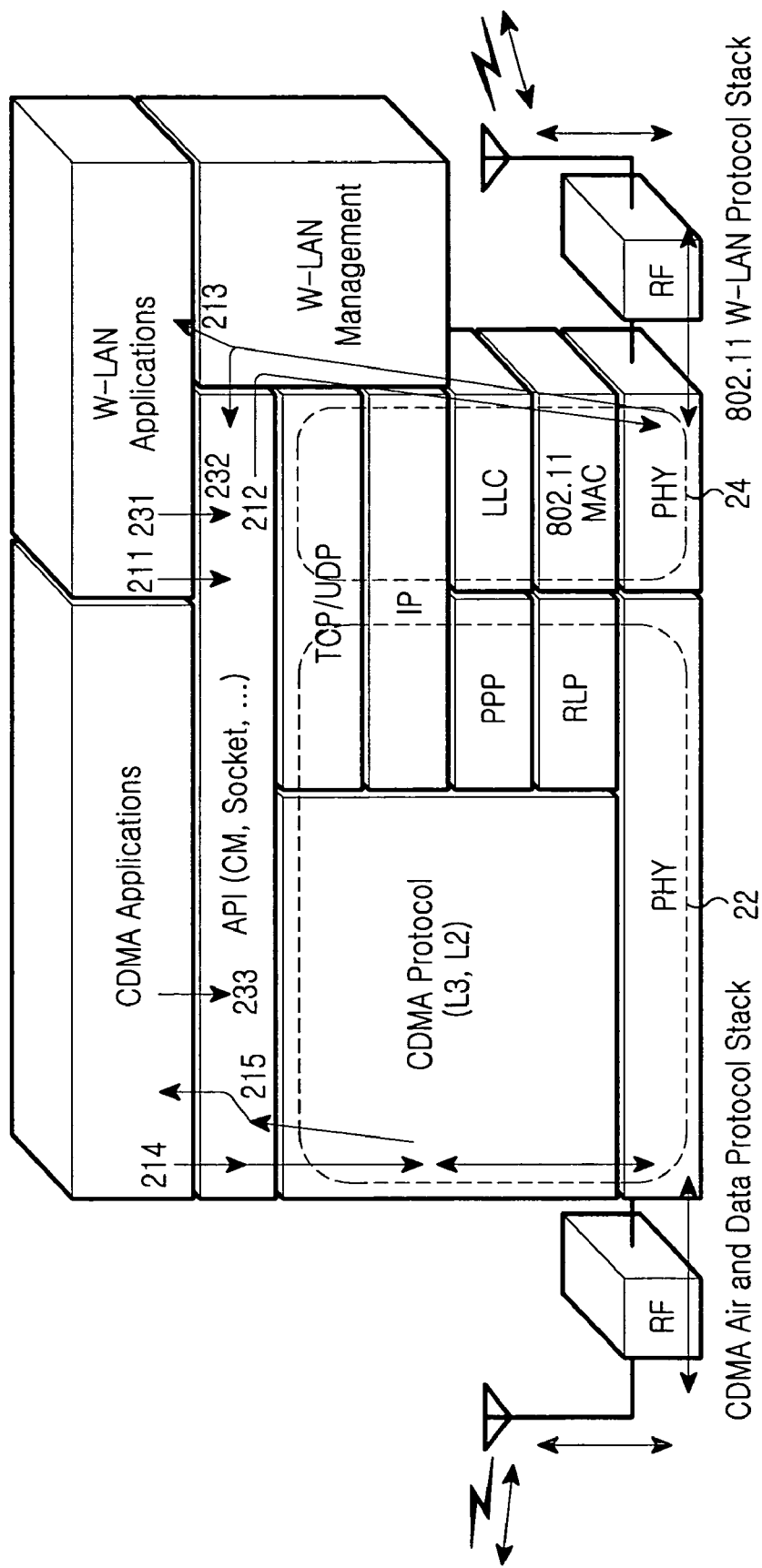
FIG. 2 is a diagram illustrating a protocol stack used for explaining a procedure of performing a voice call function in the middle of performing a wireless LAN (W-LAN) function according to an exemplary embodiment of the present invention.

FIG. 2 is a diagram illustrating a protocol stack used for explaining a procedure of performing a voice call function while performing a W-LAN function first set according to an exemplary embodiment of the present invention. Herein, the protocol stack is employed for realizing functions of the CDMA modem 12 and the W-LAN module 14 shown in FIG. 1. Referring to FIG. 2, in the structure of the protocol stack for performing an operation according to an exemplary embodiment of the present invention, a CDMA application and a W-LAN application are positioned at the uppermost layer. An application programming interface (API) positioned at the lower part of the CDMA application and the W-LAN application denotes a set of functions used for developing applications and performs an interface function between the CDMA and W-LAN applications and lower layer programs. A CDMA protocol stack 22 and a W-LAN protocol stack 24 are positioned at the lower part of the API. In addition, a W-LAN management program is separately positioned at the lower part of the W-LAN application.

In the CDMA protocol stack 22, L3 and L2 CDMA protocols are positioned at one side of the stack 22, and the Transmission Control Protocol (TCP)/User Datagram Protocol (UDP) is positioned at the other side of the stack 22. The Internet protocol (IP), the Point-to-Point Protocol (PPP), and the Radio Link Protocol (RLP) are sequentially positioned at the lower part of the TCP/UDP. The Physical (PHY) layer protocol is positioned at the lowermost part of the protocol stack 22. The W-LAN protocol stack 24 comprises the TCP/UDP and the IP positioned at the lower part of the TCP/UDP, which are protocols commonly used with the CDMA protocol stack 22. The W-LAN protocol stack 24 comprises the Logical Link Control (LLC) protocol, the Medium Access Control (MAC) protocol, and the PHY layer protocol sequentially positioned at the lower part of the IP.

Referring to FIG. 2, if the W-LAN function is established, the W-LAN application reports the application program interface (API) such as a Call Manager (CM) to obtain a W-LAN function and set the W-LAN function in the same manner as that in which a CDMA data call is set in step 211. Accordingly, the API performs processes necessary for setting the W-LAN function in step 212 and then reports the W-LAN management program to set the W-LAN function in order to drive the W-LAN function, so that the W-LAN management program can connect with a W-LAN AP through the LLC protocol, the MAC protocol, and the PHY protocol (lower protocols). If the W-LAN management program is successfully connected to the W-LAN AP so that the setting of the W-LAN function may be completed, the completion of the W-LAN function setting is reported to the API and the W-LAN application.

In this state, if the CDMA application performs a function of transmitting/receiving a voice call in step 214, the CDMA application requests the API to execute the function of transmitting/receiving the voice call so that the CDMA protocol can be performed, thereby setting the function of transmitting/receiving the voice call. If the voice call is successfully established, the successful establishment of the voice call is reported to the API and the CDMA application in step 215, so that a Simultaneous Voice and Data (SVD) function can be performed.

Figure 3:
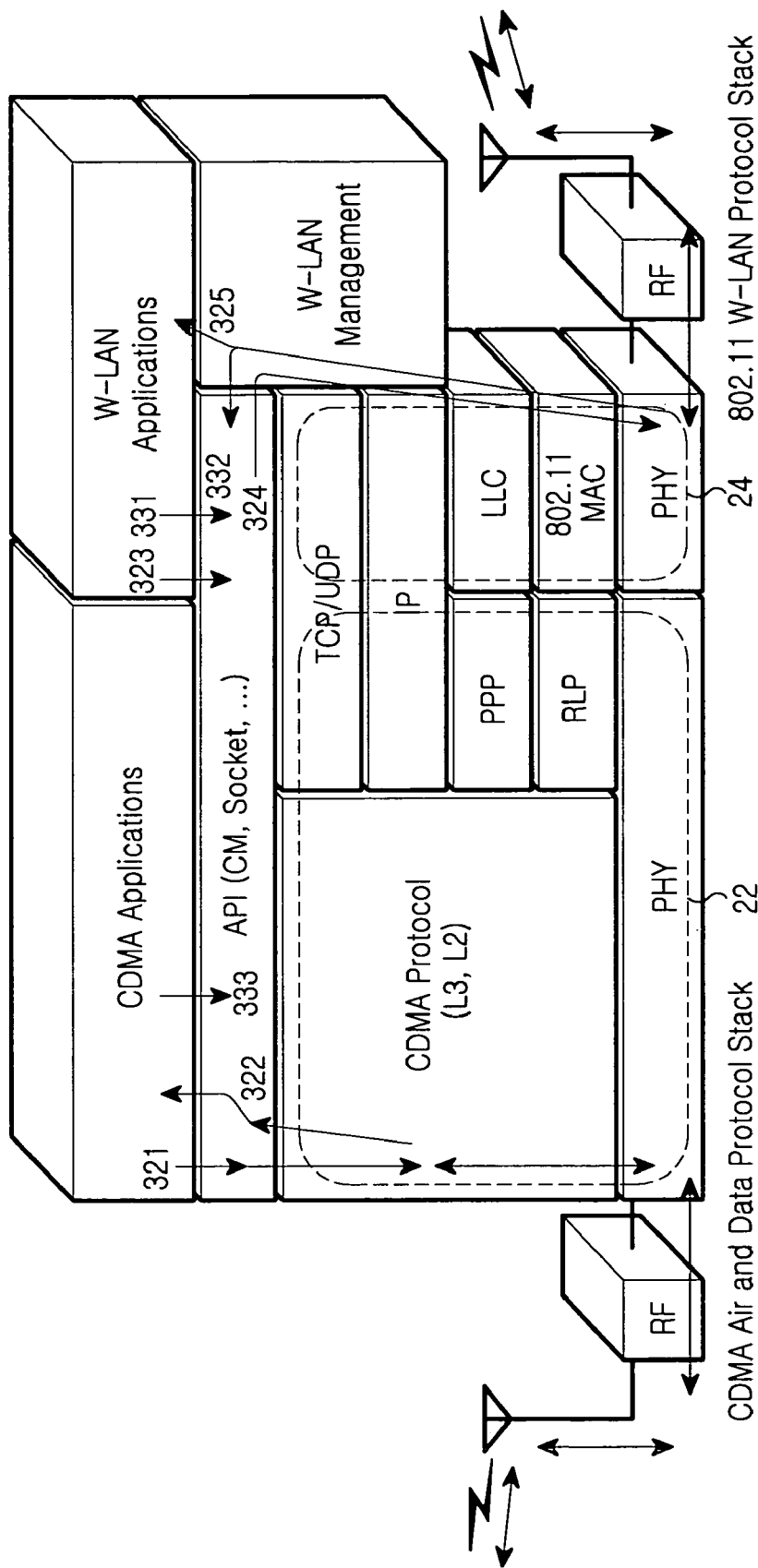
FIG. 3 is a diagram illustrating a protocol stack, which is employed for realizing functions of a code division multiple access (CDMA) modem and a W-LAN module shown in FIG. 1, used for explaining a procedure of performing a W-LAN service in the middle of performing a set voice communication function according to an exemplary embodiment of the present invention.

As described above, although one of the voice call function and the W-LAN function is terminated while the voice call function and the W-LAN function are being performed at the same time, the remaining function is continuous. In other words, if the W-LAN application is terminated, the CDMA application maintains the SVD function as shown in step 231 of FIG. 2. In the meantime, if the termination of the W-LAN function starts, (in step 232) the termination of the W-LAN function is reported to the API such that the W-LAN function is terminated in the same manner as that in which the CDMA data call is terminated. Thereafter, only the voice call function is performed. In contrast, if the voice call is terminated, only the W-LAN function is performed as shown in step 233. FIG. 3 is a diagram illustrating a protocol stack, which is employed for realizing functions of the CDMA modem 12 and the W-LAN module 14 shown in FIG. 1, used for explaining a procedure of performing a W-LAN function while performing a voice call function first set according to an exemplary embodiment of the present invention. If a function of terminating/receiving a voice call is set, the CDMA application reports the API to set the function of terminating/receiving the voice call, so that the CDMA protocol is performed in step 321. In step 322, if the voice call is successfully set, the successful setting of the voice call is indicated to the API and the CDMA application, thereby completing a voice call setting operation.

In this state, if a W-LAN function is set in step 323, the API is requested to obtain a W-LAN and set a W-LAN function in the same manner as that in which a CDMA data call is set. Accordingly, the API performs processes necessary for setting the W-LAN function in step 324 and then reports the setting of the W-LAN function to the W-LAN management program in order to drive the W-LAN function, so that the W-LAN management program can connect with a W-LAN AP. If the W-LAN management program is successfully connected to the W-LAN AP so that the setting of the W-LAN function is completed, the completion of the W-LAN function setting is reported to the API and the W-LAN application in step 325.

As described above, although one of the voice call functions and the W-LAN functions is terminated while the voice call function and the W-LAN function are being performed at essentially the same time, the remaining function is continuous. In other words, if the W-LAN application is terminated, the CDMA application maintains the SVD function as shown in step 331 of FIG. 3. In the meantime, if the termination of the W-LAN function starts, (in step 332) the termination of the W-LAN function is reported to the API such that the API terminates the W-LAN function in the same manner as that in which the CDMA data call is terminated. Thereafter, only the voice call function is performed. In contrast, if the voice call is terminated, only the W-LAN function is performed as shown in step 333.

Hereinafter, a procedure of performing the voice call function and the W-LAN function at essentially the same time will be described with reference to the accompanying drawings. The accompanying drawings have a plurality of variables are disclosed therein. The meanings of the variables are as follows:

1. NumOf_call_id: the number of calls currently under the service;
2. Voice_Call_Connected: a flag indicating whether or not a voice call is connected;
3. Data_Call_Connected: a flag indicating whether or not a data call is connected; and
4. Wlan_Enable: a flag indicating whether or not it is possible to service a W-LAN function.

Figure 4:
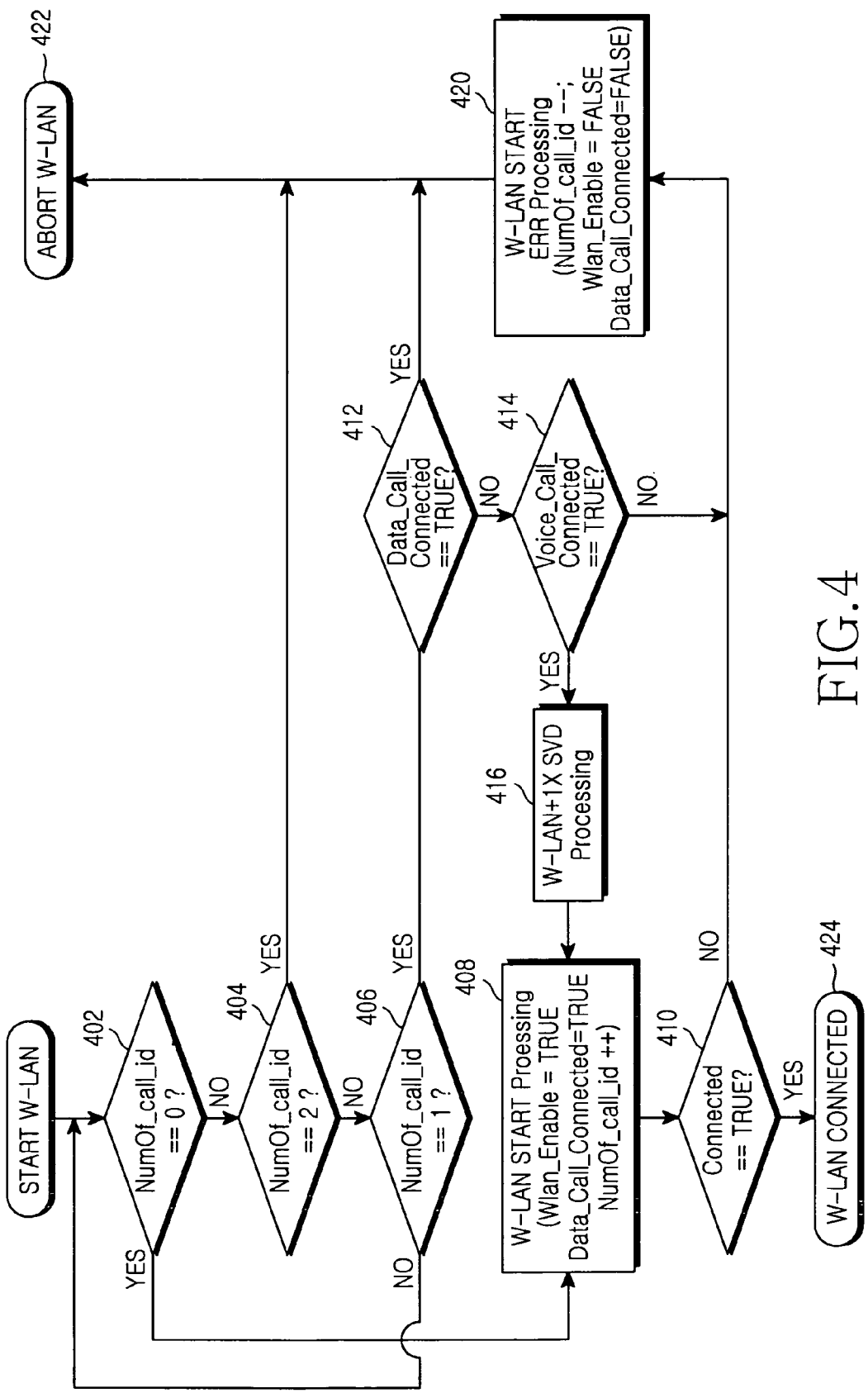
FIG. 4 is a flowchart illustrating a procedure of starting a W-LAN service in a mobile communication terminal according to an exemplary embodiment of the present invention.

FIG. 4 is a flowchart illustrating a procedure of starting a W-LAN function in a mobile communication terminal according to an exemplary embodiment of the present invention. In the procedure of starting the W-LAN function, the number of calls currently under the service is determined in steps 402, 404, and 406. This is necessary in order to set the W-LAN function after determining if a CDMA data call is being serviced because the W-LAN function is set in the same manner as that in which the CDMA data call is set using a SVD function of simultaneously performing a conventional CDMA voice call and a conventional data call according to an exemplary embodiment of the present invention.

Referring to FIG. 4, in step 402, it is determined if the number of calls currently under the service (NumOf_call_id) is '0'. If the number of calls currently under the service is '0' as the determination result, the W-LAN function is performed in step 408. If the number of calls currently under the service is not '0' as the determination result, it is determined in step 404 if the number of calls currently under the service is '2'. If the number of calls currently under the service is '2' as the determination result, the procedure of starting the W-LAN function is stopped at step 422. If the number of calls currently under the service is not 2 as the determination result, it is determined in step 406 if the number of calls currently under the service is '1'. If the number of calls currently under the service is '1' as the determination result, step 412 is performed.

It is determined in step 412 if the flag (Data_Call_Connected) indicating whether or not the data call is connected corresponds to 'true (1)'. In other words, it is determined if the data call is in a connection state. If the data call is connected, the operation of starting the W-LAN function is stopped at step 422. If the data call is not connected, it is determined in step 414 if the flag (Voice_Call_Connected) indicating whether or not a voice call is connected corresponds to 'true (1)'. In other words, it is determined in step 414 if the current voice call is in a connection state. If the current voice call is in a connection state, the W-LAN function is simultaneously started with the voice call service in step 416 by setting the W-LAN function in the same manner as that in which the CDMA data call is set, and then the operation of starting the W-LAN function is performed in step 408. At this time, the flag (Wlan_Enable) indicating whether or not it is possible to service the W-LAN function and the flag indicating whether or not a data call is connected are set to 'true (1)', and the number of calls currently under the service increases by '1'.

In step 410, it is determined if connection for the W-LAN is correctly achieved. If connection for the W-LAN is correctly achieved, the W-LAN function is performed thereafter at step 424. If connection for the W-LAN is not correctly achieved, the operation of starting the W-LAN service is processed as an erroneous operation at step 420. At this time, the number of calls currently under the service decreases by '1', and the flag indicating whether or not it is possible to service the W-LAN function and the flag indicating whether or not the data call is connected are set to 'false (0)'.

The operation of starting the W-LAN service can be performed as described above with reference to FIG. 4. Herein, in step 406 of FIG. 4 in which it is determined if the number of calls currently under the service is '1', it is determined that the number of calls currently under the service be '1' because the number of calls currently under the service is neither '0' nor '2' in steps 402 and 404. However, if the number of calls currently under the service is not '1' as the determination result in step 406, the operation of starting the W-LAN service is regarded as an erroneous operation, so that an additional error processing operation may be performed or the procedure of starting the W-LAN service may return to step 402 so as to repeat the steps. Also, in step 414 in which it is determined if a current voice call is in a connection state, it is determined that the current voice call should be connected because the number of calls currently under the service is 1 at step 406 and the data call is not connected at step 412. However, if the current voice call at step 414 is not connected as the determination result, the operation of starting the W-LAN service is regarded as an erroneous operation at step 420, so that an additional error processing operation may be performed or the procedure of starting the W-LAN service may be aborted at step 422.

Figure 5:
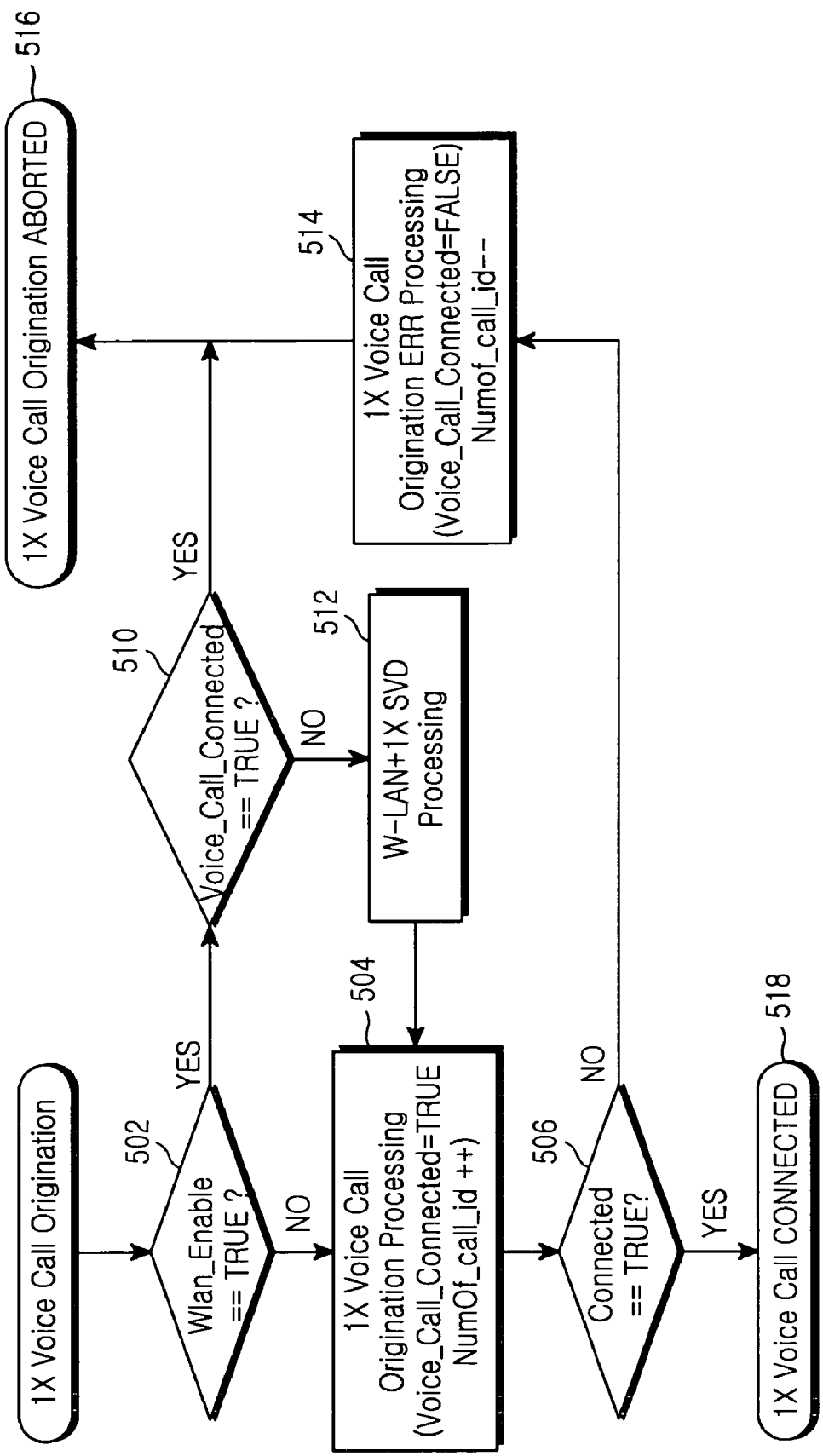
FIG. 5 is a flowchart illustrating an operation of originating a voice call in a mobile communication terminal according to an exemplary embodiment of the present invention.

FIG. 5 is a flowchart illustrating an operation of originating a voice call in a mobile communication terminal according to an exemplary embodiment of the present invention. In the operation of originating the voice call, it is determined if a W-LAN service is being performed by checking the flag indicating whether or not it is possible to currently service the W-LAN function in step 502. If the W-LAN service is not being performed as the determination result, step 504 is performed. If the W-LAN service is being performed as the determination result, it is determined if a current voice call is in a connection state in step 510. If the current voice call is connected, the operation of originating the voice call is stopped at step 516. If the current voice call is not connected, the W-LAN service and the voice call service are simultaneously started in step 512. In step 504, the operation of originating the voice call is performed. The flag indicating whether or not the voice call is connected is set to 'true (1)', and the number of calls under the service increases by '1'.

In step 506, it is determined if connection for originating a voice call is correctly achieved. If the connection for originating the voice call is correctly achieved, the operation of originating the voice call is performed thereafter at step 518. If the connection for originating the voice call is not correctly achieved, the operation of originating the voice call is processed as an erroneous operation in step 514. At this time, the number of calls currently under the service decreases by '1', and the flag indicating whether or not the voice call is connected is set to 'false (0)'.

Figure 6:
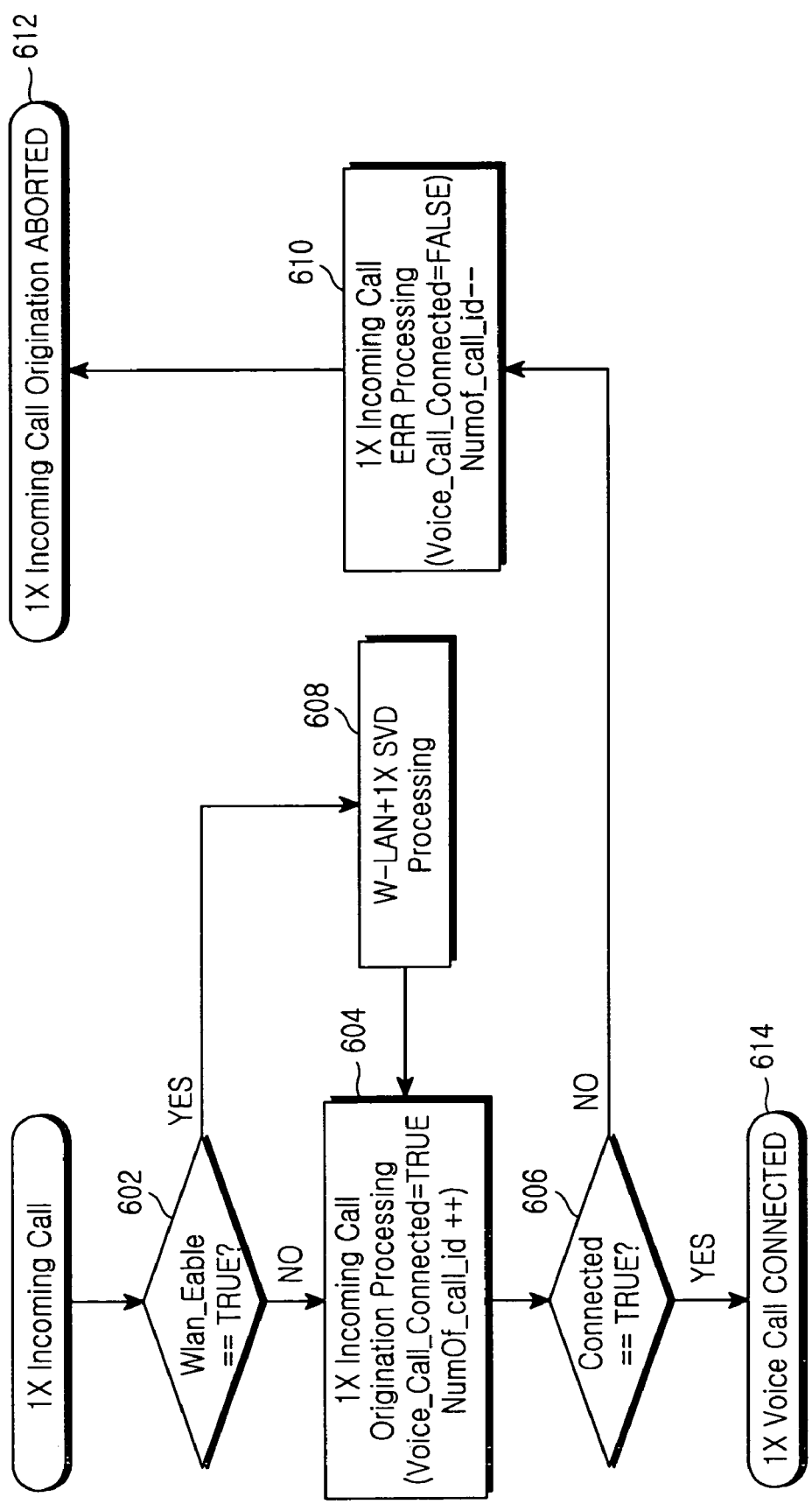
FIG. 6 is a flowchart illustrating an operation of receiving a voice call in a mobile communication terminal according to an exemplary embodiment of the present invention.

FIG. 6 is a flowchart illustrating an operation of receiving the voice call in a mobile communication terminal according to an exemplary embodiment of the present invention. In the operation of receiving the voice call, it is determined if a W-LAN service is being performed by checking the flag indicating whether or not it is possible to currently service the W-LAN function in step 602. If the W-LAN service is not being performed as the determination result, step 604 is performed. If the W-LAN service is being performed, the W-LAN service and the voice call service are simultaneously started in step 608. In step 604, the operation of receiving the voice call is performed. At this time, the flag indicating whether or not the voice call is connected is set to 'true (1)', and the number of calls under the service increases by '1'.

In step 606, it is determined if connection for receiving the voice call is correctly achieved. If the connection for receiving the voice call is correctly achieved, the operation of receiving the voice call is performed thereafter at step 614. If the connection for receiving the voice call is not correctly achieved, the operation of receiving the voice call is processed as an erroneous operation in step 610. At this time, the number of calls currently under the service decreases by '1', and the flag indicating whether or not the voice call is connected is set to 'false (0)' and the incoming call is aborted at step 612.

Figure 7:
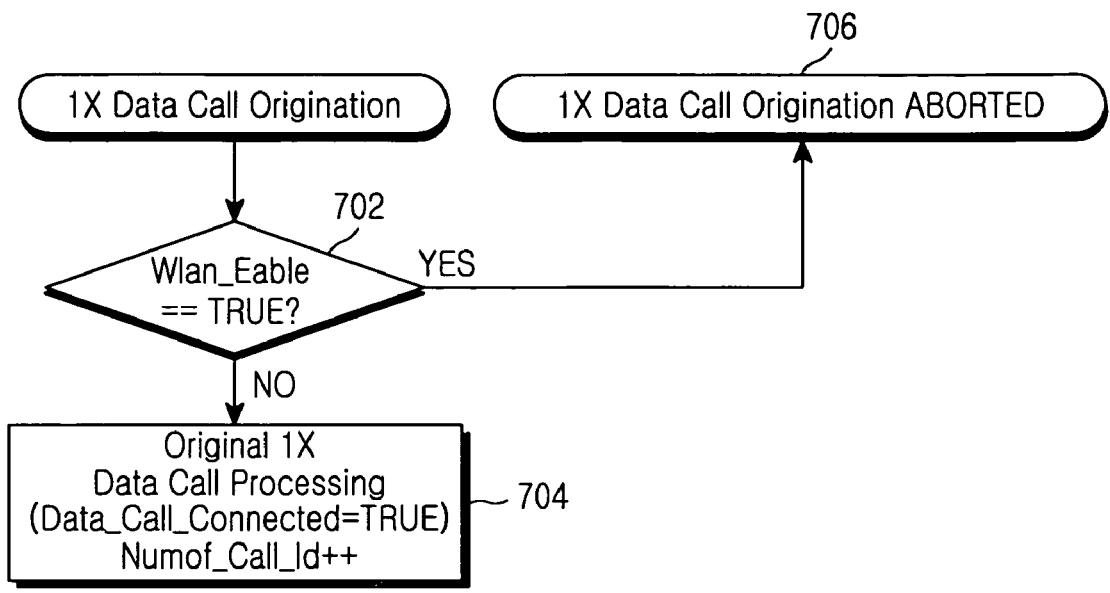
FIG. 7 is a flowchart illustrating an operation of originating a CDMA data call in a mobile communication terminal according to an exemplary embodiment of the present invention.

FIG. 7 is a flowchart illustrating an operation of originating a CDMA data call in a mobile communication terminal according to an exemplary embodiment of the present invention. In the operation of originating the CDMA data call, it is determined if a W-LAN service is being performed by checking the flag indicating whether or not it is possible to currently service the W-LAN function in step 702. If the W-LAN service is being performed as the determination result, the operation of originating the CDMA data call is stopped at step 706. If the W-LAN service is not being performed as the determination result, the operation of originating the CDMA data call is performed in step 704. At this time, the flag indicating whether or not the CDMA data call is connected is set to 'true (1)', and the number of calls currently under the service increases by '1'.

Figure 8:
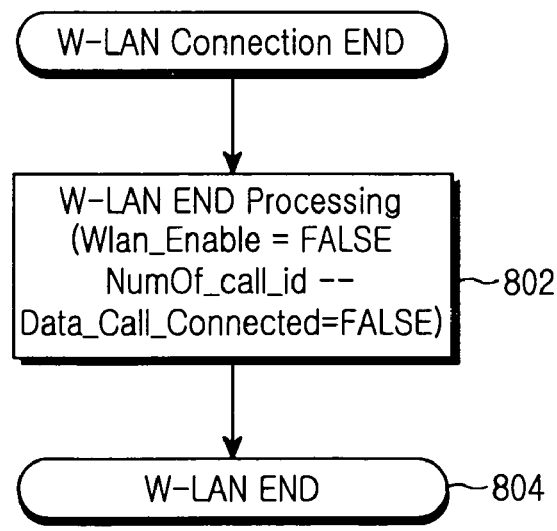
FIG. 8 is a flowchart illustrating an operation of terminating a W-LAN service in a mobile communication terminal according to an exemplary embodiment of the present invention.

FIG. 8 is a flowchart illustrating an operation of terminating a W-LAN service in a mobile communication terminal according to an exemplary embodiment of the present invention. In the operation of terminating the W-LAN service, the W-LAN service is terminated in step 802. At this time, the flag indicating whether or not it is possible to service the W-LAN function and the flag indicating whether or not a data call is connected are set to 'false (0)', and the number of calls currently under the service decreases by '1' and the process ends at step 804.

Figure 9:
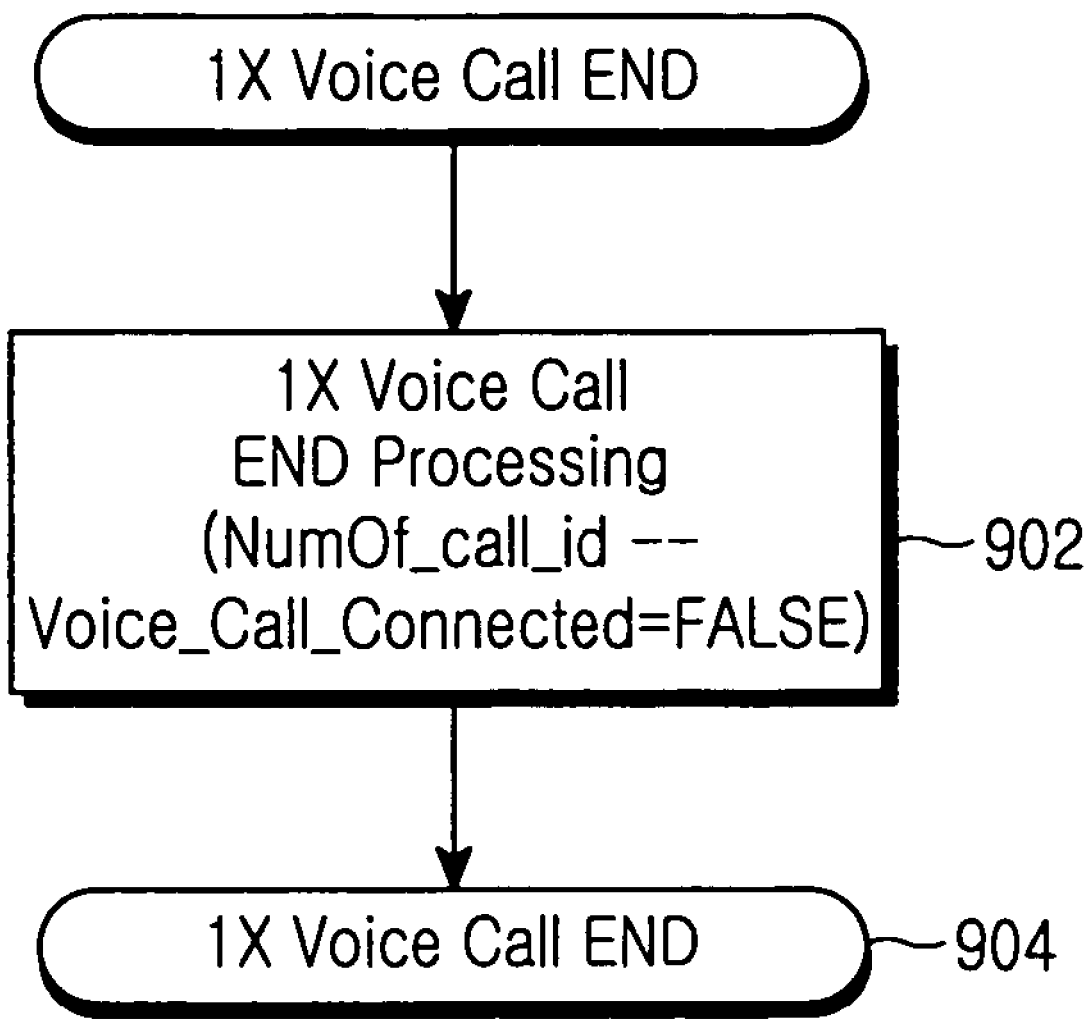
FIG. 9 is a flowchart illustrating an operation of terminating a voice call in a mobile communication terminal according to an exemplary embodiment of the present invention.

FIG. 9 is a flowchart illustrating an operation of terminating a voice call in a mobile communication terminal according to an exemplary embodiment of the present invention. In the operation of terminating the voice call, the voice call is terminated in step 902. At this time, the flag indicating whether or not the voice call is connected is set to 'false (0)', and the number of calls currently under the service decreases by '1' and the voice call is stopped at step 904.

As described above, in a wireless Internet communication method of a mobile communication terminal according to exemplary embodiments of the present invention, a W-LAN function is set in the same manner as that in which a CDMA data call is set through modification of the SVD scheme, so that a W-LAN data protocol such as the DHCP (which can be used when the W-LAN function is set) and a voice call service can be provided at the same time. Herein, when a software (which does not support data concurrency) is employed, it is possible to prevent the origination of a CDMA data call capable of causing an erroneous operation during the W-LAN operation.

Wireless Internet communication can be performed in a mobile communication terminal according to exemplary embodiments of the present invention as described above. While the invention has been shown and described with reference to certain embodiments thereof, it will be understood by those skilled in the art that various changes in form and details may be made therein without departing from the spirit and scope of the invention. For example, although the present invention is applied to a CDMA system, the present invention is adaptable for the global system for mobile communication (GSM), the universal mobile telecommunication system (UMTS), and so on. Also, although the present invention is applied to a wireless local area network (W-LAN), the present invention is adaptable for other wireless access technique such as a wireless metropolitan area network (WMAN), or a portable Internet. In addition, according to exemplary embodiments of the present invention, access to an Ad-Hoc network can be achieved by using a W-LAN or Bluetooth, and a CDMA voice call can be serviced during access to the Ad-Hoc network. Consequently, the scope of the invention should not be limited to the embodiments, but should be defined by the appended claims and equivalents thereof.

Further, the operations mentioned in this disclosure can be in the form of a program code embodied on a computer-readable medium for wireless Internet communication in a mobile communication terminal.

What is claimed is:

1. A method for wireless Internet communication in a mobile communication terminal, the method comprising the steps of:
    in an operation for starting a wireless Internet function, determining if a data call is being serviced; and
    if a data call is not being serviced, starting the wireless Internet function by setting the wireless Internet function as a data call, such that a voice call and the wireless Internet function can be serviced at the same time.

2. The method as claimed in claim 1, further comprising the steps of:
    in an operation of originating or terminating a voice call, determining if a wireless Internet function is being performed; and
    if the wireless Internet function is being performed, establishing substantially concurrently the wireless Internet function and a voice call service.

3. The method as claimed in claim 1, further comprising the steps of:
    in an operation of originating a voice call, determining if a wireless Internet function is being performed;
    if the wireless Internet function is being performed, establishing the wireless Internet function to be substantially concurrent with a voice call service.

4. The method as claimed in claim 1, further comprising the steps of:
    in an operation of originating a data call, determining if a wireless Internet function is being performed; and
    if the wireless Internet function is not being performed, performing the operation of originating the data call.

5. A method for wireless Internet communication in a mobile communication terminal, the method comprising the steps of:
    in an operation of starting a wireless Internet function, determining a number of calls currently serviced;
    if the number of calls currently serviced is '0', starting the wireless Internet function by setting the wireless Internet function as a data call;
    if the number of calls currently serviced is '1' as the determination result, determining if a data call is connected; and
    if the data call is not connected, starting substantially simultaneously the wireless Internet function and a voice call service by setting the wireless Internet function as a data call, such that a voice call and the wireless Internet function can be serviced at the same time.

6. The method as claimed in claim 5, further comprising the steps of:
    in an operation of originating a voice call, determining if a wireless Internet function is being performed;
    if the wireless Internet function is being performed, establishing substantially concurrently the wireless Internet function and a voice call service;
    if the wireless Internet function is not being performed, determining if the voice call is connected; and
    if the voice call is not being connected, originating the voice call.

7. The method as claimed in claim 6, further comprising the steps of:
    in an operation of receiving a voice call, determining if a wireless Internet function is being performed;
    if the wireless Internet function is being performed, substantially simultaneously starting the wireless Internet function and a voice call service; and
    if the wireless Internet function is not being performed, receiving the voice call.

8. The method as claimed in claim 7, further comprising the steps of:
    in an operation of originating a data call, determining if a wireless Internet function is being performed; and
    if the wireless Internet function is not being performed, originating the data call.

9. A program code embodied on a non-transitory computer-readable medium for wireless Internet communication in a mobile communication terminal, the program code comprising:
    a first set of instructions for determining if a data call is being serviced in an operation of starting a wireless Internet function; and
    if a data call is not being serviced, a second set of instructions for starting the wireless Internet function by setting the wireless Internet function as a data call, such that a voice call and the wireless Internet function can be serviced at the same time.

10. The program code as claimed in claim 9, further comprising:
    in an operation of originating or terminating a voice call, a third set of instructions for determining if a wireless Internet function is being performed; and
    if the wireless Internet function is being performed, a fourth set of instructions for establishing substantially concurrently the wireless Internet function and a voice call service.

11. The program code as claimed in claim 9, further comprising:
- in an operation of originating a voice call, a third set of instructions for determining if a wireless Internet function is being performed; and
- if the wireless Internet function is being performed, a fourth set of instructions for establishing a wireless Internet function that is substantially concurrent with a voice call service.

12. The program code as claimed in claim 9, further comprising:
- in an operation of originating a data call, a third set of instructions for determining if a wireless Internet function is being performed; and
- if the wireless Internet function is not being performed, a fourth set of instructions for performing the operation of originating the data call.

13. A program code embodied on a non-transitory computer-readable medium for wireless Internet communication in a mobile communication terminal, the program code comprising:
- in an operation of starting a wireless Internet function, a first set of instructions for determining a number of calls currently serviced;
- if the number of calls currently serviced is '0', a second set of instructions for starting the wireless Internet function by setting the wireless Internet function as a data call;
- if the number of calls currently serviced is '1' as the determination result, a third set of instructions for determining if a data call is connected; and
- if the data call is not connected, a fourth set of instructions for starting substantially simultaneously the wireless Internet function and a voice call service by setting the wireless Internet function as a data call, such that a voice call and the wireless Internet function can be serviced at the same time.

14. The program code as claimed in claim 13, further comprising:
- in an operation of originating a voice call, a fifth set of instructions for determining if a wireless Internet function is being performed;
- if the wireless Internet function is being performed, a sixth set of instructions for establishing substantially concurrently the wireless Internet function and a voice call service;
- if the wireless Internet function is not being performed, a seventh set of instructions for determining if the voice call is connected; and
- if the voice call is not being connected, an eighth set of instructions for originating the voice call.

15. The program code as claimed in claim 14, further comprising:
- in an operation of receiving a voice call, a ninth set of instructions for determining if a wireless Internet function is being performed;
- if the wireless Internet function is being performed, a tenth set of instructions for substantially simultaneously starting the wireless Internet function and a voice call service; and
- if the wireless Internet function is not being performed, an eleventh set of instructions for receiving the voice call.

16. The program code as claimed in claim 15, further comprising:
- in an operation of originating a data call, a twelfth set of instructions for determining if a wireless Internet function is being performed; and
- if the wireless Internet function is not being performed, a thirteenth set of instructions for originating the data call.

* * * * *